United States Patent
Kim

(10) Patent No.: US 10,030,589 B1
(45) Date of Patent: Jul. 24, 2018

(54) ENGINE-DRIVEN ELECTRICITY GENERATION SYSTEM USING DIESEL ENGINE FROM SCRAPPED VEHICLE CAPABLE OF USING BOTH DIESEL AND LNG

(71) Applicant: INNOBE Co., Ltd., Uiwang-si, Gyeonggi-do (KR)

(72) Inventor: Seung Chul Kim, Yongin-si (KR)

(73) Assignee: INNOBE Co., Ltd., Uiwang-si, Gyeonggi-do (KR)

( * ) Notice: Subject to any disclaimer, the term of this patent is extended or adjusted under 35 U.S.C. 154(b) by 0 days.

(21) Appl. No.: 15/924,300

(22) Filed: Mar. 19, 2018

Related U.S. Application Data

(63) Continuation-in-part of application No. 15/163,669, filed on May 25, 2016.

(30) Foreign Application Priority Data

Jun. 18, 2015 (KR) .................. 10-2015-0086505

(51) Int. Cl.
| | |
|---|---|
| F02B 69/04 | (2006.01) |
| F02D 19/10 | (2006.01) |
| F02D 19/06 | (2006.01) |
| F02B 63/04 | (2006.01) |
| F02B 43/10 | (2006.01) |
| F01N 3/02 | (2006.01) |
| F01M 5/00 | (2006.01) |
| F02M 31/13 | (2006.01) |
| F02D 41/00 | (2006.01) |
| F02M 21/02 | (2006.01) |

(52) U.S. Cl.
CPC ......... *F02D 19/0647* (2013.01); *F01M 5/001* (2013.01); *F01N 3/0205* (2013.01); *F02B 43/10* (2013.01); *F02B 63/04* (2013.01); *F02B 69/04* (2013.01); *F02D 19/10* (2013.01); *F02D 41/0027* (2013.01); *F02M 21/0215* (2013.01); *F02M 31/13* (2013.01); *F02B 2043/103* (2013.01)

(58) Field of Classification Search
CPC .... F02B 69/04; F02B 2043/103; F02D 19/10; F02D 41/0027; F02M 21/0215
USPC ..... 123/27 GE, 304, 525, 526, 196 AB, 549, 123/553, 556; 60/320
See application file for complete search history.

(56) References Cited

U.S. PATENT DOCUMENTS

| | | | |
|---|---|---|---|
| 4,399,774 | A | 8/1983 | Tsutsumi |
| 4,605,837 | A | 8/1986 | Chen |
| 5,365,902 | A | 11/1994 | Hsu |
| 5,487,362 | A | 1/1996 | Wellev |
| 5,551,384 | A | 9/1996 | Hollis |
| 6,230,683 | B1 | 5/2001 | zur Loye |
| 8,042,326 | B2 | 10/2011 | Farell |
| 8,925,518 | B1 | 1/2015 | Riley |

(Continued)

FOREIGN PATENT DOCUMENTS

| | | |
|---|---|---|
| KR | 1020090027810 A | 3/2009 |
| KR | 1020090056104 A | 6/2009 |

*Primary Examiner* — Erick Solis
(74) *Attorney, Agent, or Firm* — Revolution IP, PLLC

(57) ABSTRACT

An engine-driven electricity generation system can selectively use diesel and LNG as fuel by recycling a diesel engine from a scrapped vehicle and heats intake air with an electric heater to start an engine using LNG and then heats the intake air using heat from a high-temperature exhaust gas after starting the engine, thereby accelerating ignition of LNG.

3 Claims, 2 Drawing Sheets

(56) References Cited

U.S. PATENT DOCUMENTS

| | | |
|---|---|---|
| 2002/0002967 A1 | 1/2002 | Paul |
| 2008/0022965 A1 | 1/2008 | Bysveen |
| 2008/0276913 A1 | 11/2008 | Zubeck |
| 2009/0178387 A1 | 7/2009 | Schultz |
| 2012/0085326 A1 | 4/2012 | Mo |
| 2013/0333668 A1 | 12/2013 | Coldren |
| 2017/0074183 A1 | 3/2017 | Howard |
| 2017/0126057 A1 | 5/2017 | Jenison |

ENGINE-DRIVEN ELECTRICITY GENERATION SYSTEM USING DIESEL ENGINE FROM SCRAPPED VEHICLE CAPABLE OF USING BOTH DIESEL AND LNG

CROSS-REFERENCE TO RELATED APPLICATIONS

This application is a Continuation-In-Part Application of U.S. patent application Ser. No. 15/163,669 filed on May 25, 2016 under 35 U.S.C. § 120, which claims priority to Korean Patent Application No. 10-2015-0086505 filed on Jun. 18, 2015, in the Korean Intellectual Property Office, the disclosure of which is incorporated herein by reference.

BACKGROUND

The present invention relates to an engine-driven electricity generation system and, more particularly, to an engine-driven electricity generation system that can selectively use diesel and LNG as fuel by recycling a diesel engine from a scrapped vehicle.

There is a need for a review of the ways of generating electricity due to an increase in cost for electricity generation and environmental regulations such as total $CO_2$ emission control due to a continuous increase in oil price. Existing common facilities for thermal power generation or for power generation using renewable energy require a great amount of early investment cost or are difficult to be continuously and stably supplied with power. Accordingly, the government regulates enhancement of post management at facilities that consume a large amount of power so that self-power generators at the facilities can generate power for one hour for the peak time, but the costs for purchasing and operating the self-power generators are very high, and thus, use of the self-power generators have been decreased. Therefore, a concern about an engine-driven electricity generator that uses the engine of a scrapped vehicle as a power generator has been increased to reduce the costs for purchasing and operating a self-power generator. However, engine-driven electricity generators that have been developed up to now have been designed to use only one of diesel and LNG, so there has been a limit in selection of fuel.

PRIOR ART DOCUMENT

Patent Document (Patent Document 1) Korean Patent Application Publication No. 2009-0056104
(Patent Document 2) Korean Patent Application Publication No. 2009-0027810

SUMMARY

An aspect of the present invention provides an engine-driven electricity generation system using both diesel and LNG that can selectively use diesel and LNG by recycling a diesel engine from a scrapped diesel vehicle. Another aspect of the present invention provides an engine-driven electricity generation system that can accelerate ignition of LNG by heating intake air using a restored exhaust gas and can save fuel by reducing rotational friction of a crankshaft by reducing viscosity of oil by heating an oil pan using an exhaust gas.

According to an aspect of the present invention, there is provided an engine-driven electricity generation system using a diesel engine from a scrapped vehicle capable of using both diesel and LNG, the system including: An engine-driven electricity generation system using a diesel engine from a scrapped vehicle capable of using both diesel and LNG, the system comprising: a scrapped diesel engine obtained from a scrapped diesel vehicle; a power generator connected to the scrapped diesel engine and generating electricity; an LNG tank keeping LNG as fuel for the scrapped diesel engine; a diesel tank keeping diesel as fuel for the scrapped diesel engine; an intake pipe for in-taking external air and then supplying the intake external air to the scrapped diesel engine; an exhaust pipe for discharging an exhaust gas produced by operation of the scrapped diesel engine to the outside; an electric heater heating intake air flowing through the intake pipe to firstly start the scrapped diesel engine when LNG is used as fuel for the scrapped diesel engine; a heat exchanger heating the intake air flowing through the intake pipe by restoring a exhaust gas discharged through the exhaust pipe after the scrapped diesel engine is started; a first solenoid valve controlling a exhaust gas which intake from the exhaust pipe to the heat exchanger; an LNG injection unit connected to the intake pipe, and injecting the LNG to inflow the injected LNG to the cylinder of the scrapped diesel engine; an LNG supplying pipe connecting the LNG injection unit and the LNG tank; a diesel supplying pipe connecting the injector of the scrapped diesel engine and the diesel tank; a first valve unit provided at the LNG supplying pipe, which controls supplying a LNG to the LNG injection unit; a second valve unit provided at the diesel supplying pipe, which controls supplying a diesel to the injector; a controller controlling entire operation, wherein when LNG is selected as fuel, the controller controls the first valve unit to supply a LNG to the LNG injection unit, and operates the electric heater to heat the intake air, and controls the LNG injection unit to inject a LNG, and after sensing that the scrapped diesel engine has been started, stops operation of the electric heater, and opens the first solenoid valve so that an exhaust gas discharged through the exhaust pipe is supplied to the heat exchanger and thus heats the intake air flowing through the intake pipe.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Hereinafter, the configuration and operation of an engine-driven electricity generation system using a diesel engine from a scrapped vehicle capable of using both diesel and LNG according to the present invention will be described in detail with reference to the accompanying drawings and embodiments.

Figure 1:
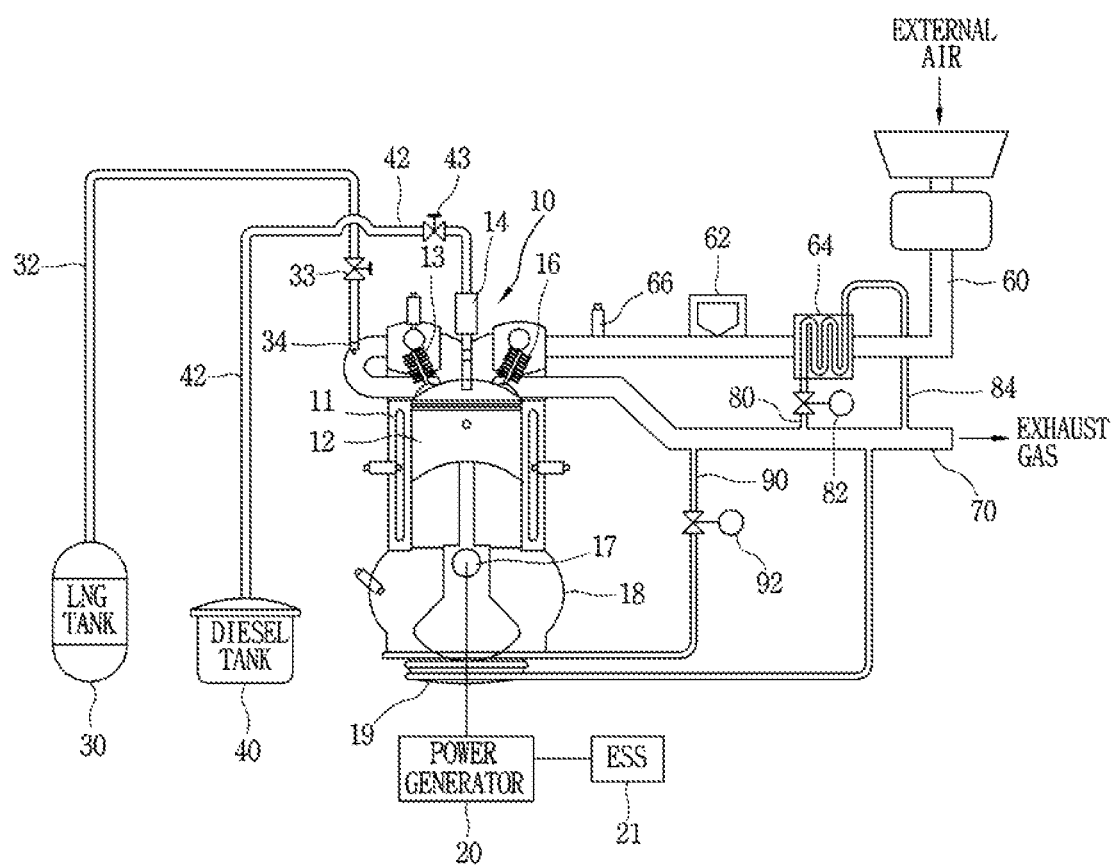
FIG. 1 is a diagram showing the entire configuration of an engine-driven electricity generation system using a diesel engine from a scrapped vehicle capable of using both diesel and LNG according to the present invention.

As shown in FIG. 1, an engine-driven electricity generation system according to the present invention includes a scrapped diesel engine 10, a power generator 20, an LNG tank 30, a diesel tank 40, an intake pipe 60, an exhaust pipe 70, an electric heater 62, a heat exchanger 64, a first solenoid valve 82, an LNG injection unit 34, an LNG supplying pipe 32, a diesel supplying pipe 42, a first valve unit 33, a second valve unit 43, and a controller 100.

The scrapped diesel engine 10 is recycled by restoring a diesel engine from a scrapped vehicle and then repairing it and includes, similar to common diesel engines, a cylinder 11, a piston 12, an intake valve 13, an injector 14, an exhaust valve 16, a crankshaft 17, a crankcase 18, and an oil pan 19. The configuration and operation way of the diesel engine are well known in the art, so detailed description is not provided. Here, an intake pipe 60 for in-taking external air and then guiding the intake external air inside is connected to a side of the top of the cylinder 11 and is opened/closed by the intake valve 13. Further, an exhaust pipe 70 for discharging an exhaust gas produced by explosion in the engine to the outside is connected to another side of the top of the cylinder 11 and is opened/closed by the exhaust valve 16.

The power generator 20 generates electricity using torque from the scrapped diesel engine 10 and may include an ESS 21 (Energy Storage System) to keep the produced electricity. The produced electricity in the power generator 20 may be supplied to home appliances.

The engine-driven electricity generation system according to the present invention is configured to use both diesel and LNG. Accordingly, the engine-driven electricity generation system according to the present invention includes the diesel tank 40 and the LNG tank 30, in which the diesel supplying tank 40 is connected to the injector 14 through a diesel pipe 42 and the LNG tank 30 is connected to the LNG injection unit 34 through an LNG supplying pipe 32. The LNG injection unit 34 is inserted into the LNG supplying pipe 32 and injects LNG in the LNG supplying pipe 32. Therefore, LNG injected in the LNG supplying pipe 32 is mixed with intake air being supplied through the intake pipe 60.

When diesel is used as fuel, the engine in the system can operate and generate electricity without specific measures because the engine is originally a diesel engine. However, in order to use LNG as fuel, it is not easy to ignite LNG in a diesel engine because LNG is relatively higher in ignition point than diesel. Accordingly, intake air to be mixed with LNG is heated before being supplied in order to accelerate ignition of the LNG in the present invention. Therefore, the engine-driven electricity generation system according to the present invention additionally includes the electric heater 62.

The electric heater 62 is disposed on the intake pipe 60, and heats and supplies intake air to be mixed with LNG to the scrapped diesel engine 10, and it was found that LNG was ignited well when the temperature of the heated intake air was about 250 to 300° C. A temperature sensor 66 may be further disposed on the intake pipe 60 to measure the temperature of the intake air heated by the electric heater 62.

As described above, when LNG is used as fuel, intake air is heated by the electric heater 62 and early ignition is performed, thereby starting the engine and operating the power generator 20. However, according to this configuration, the consumption amount of electric energy for operating the electric heater 62 is increased. In order to reduce such consumption of electric energy, the present invention uses the way of additionally restoring an exhaust gas produced by operation of the diesel engine and heating intake air. The temperature of an exhaust gas produced when a diesel engine is operated is about 800° C. and it is possible to reduce the consumption of electric energy that is consumed by the electric heater 62 by restoring the heat of the exhaust gas and heating intake air using the heat.

To this end, as shown in FIG. 1, a heat exchanger 64 is disposed in the intake pipe 60 and a first heat exchange pipe 80 diverging from the exhaust pipe 70 is connected to the heat exchanger 64. When an exhaust gas is produced when the engine is firstly started, the exhaust gas flows through the exhaust pipe 70 and is then supplied to the heat exchanger 64 through the first heat exchange pipe 80 diverged from the exhaust pipe 70. The heat exchanger 64 takes heat from the exhaust gas and heats the intake air flowing through the intake pipe 60 using the heat. The exhaust gas that finishes exchanging heat is again returned to the exhaust pipe 70 through a first return pipe 84 connected between the heat exchanger 64 and the exhaust pipe 70 and then discharged outside. A first solenoid valve 82 may be disposed in the first heat exchange pipe 80 to selectively heat the intake air, if necessary.

As described above, when the engine is firstly started, intake air is heated by the electric heater 62, and after the engine is started, the intake air is heated by the heat of an exhaust gas, so, in this case, an engine start-sensing unit 86 for sensing whether the scrapped diesel engine 10 has been started may be further provided.

An electronic start-sensing circuit included in the scrapped diesel engine 10 may be used as the engine start-sensing unit 86, and various sensors that sense physical quantities from which starting of the scrapped diesel engine 10 can be inferred such as a gas sensor that senses an exhaust gas discharged through the exhaust pipe 70, an RPM sensor that is connected to the crankshaft 17 or the rotation axis of the power generator 20 and senses RPM, or a current sensor that is connected to the output terminal of the power generator 20 and senses produced electricity may be used. When the engine start-sensing unit 86 senses that the scrapped diesel engine 10 has been started, a controller 100 that is described below stops the operation of the electric heater 62 and opens the first solenoid valve so that the exhaust gas discharged through the exhaust pipe 70 is supplied to the heat exchanger 64, whereby the intake air flowing through the intake pipe 60 is heated.

On the other hand, the oil pan 19 is disposed under the crankcase 18 in a common diesel engine, as shown in FIG. 1, and the oil pan 19 is a part for keeping oil to reduce rotational friction of the crankshaft 17. In general, the viscosity of oil is in inverse proportion to temperature, so when the temperature of oil is low, the viscosity is high, and an increase in viscosity of oil deteriorates lubrication, thereby increasing friction of the crankshaft 17. Accordingly, a larger force is required to operate the crankshaft 17, so the engine consumes more fuel. The present invention additionally restores an exhaust gas and increases the temperature of the oil stored in the oil pan 19 by heating the oil pan 19 using the exhaust gas in order to solve this problem.

To this end, as shown in FIG. 1, the exhaust pipe 70 and the oil pan 19 are connected to a second heat exchange pipe 90. The second heat exchange pipe 90 diverges from the exhaust pipe 70, turns around the outer side (bottom or the circumference) of the oil pan 19, and then returns to the exhaust pipe 70. Accordingly, the exhaust gas produced by operation of the diesel engine is supplied to the oil pan 19 through the second heat exchange pipe 90, heats the oil in the oil pan 19 through heat exchange, returns to the exhaust pipe 70, and is then discharged outside. Since the viscosity of the heated oil decreases, friction of the crankshaft 17 is decreased, so the fuel that is consumed by the engine can be reduced. On the other hand, a second solenoid valve 92 may be disposed in the second heat exchange pipe 90 to selectively heat the oil pan 19, if necessary.

Figure 2:
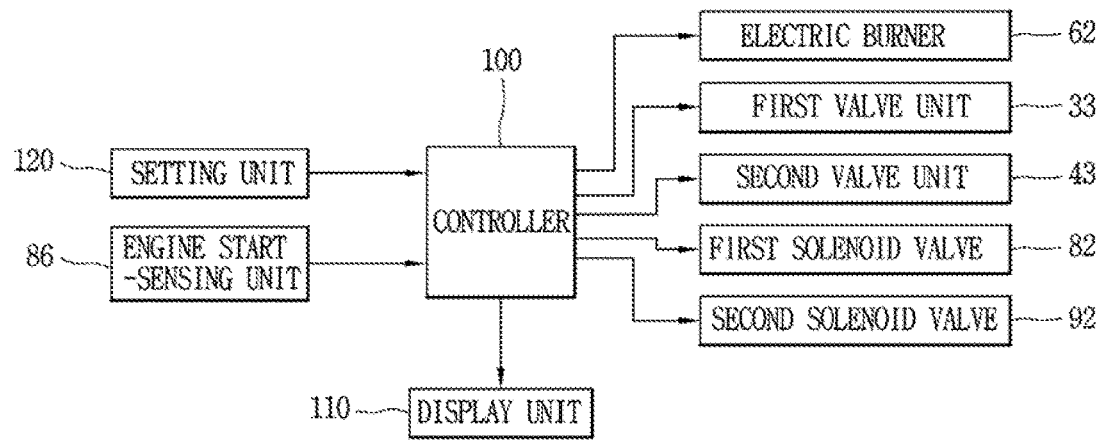
FIG. 2 is a schematic diagram showing a control system of an engine-driven electricity generation system using a diesel engine from a scrapped vehicle capable of using both diesel and LNG according to the present invention.
Figure 3:
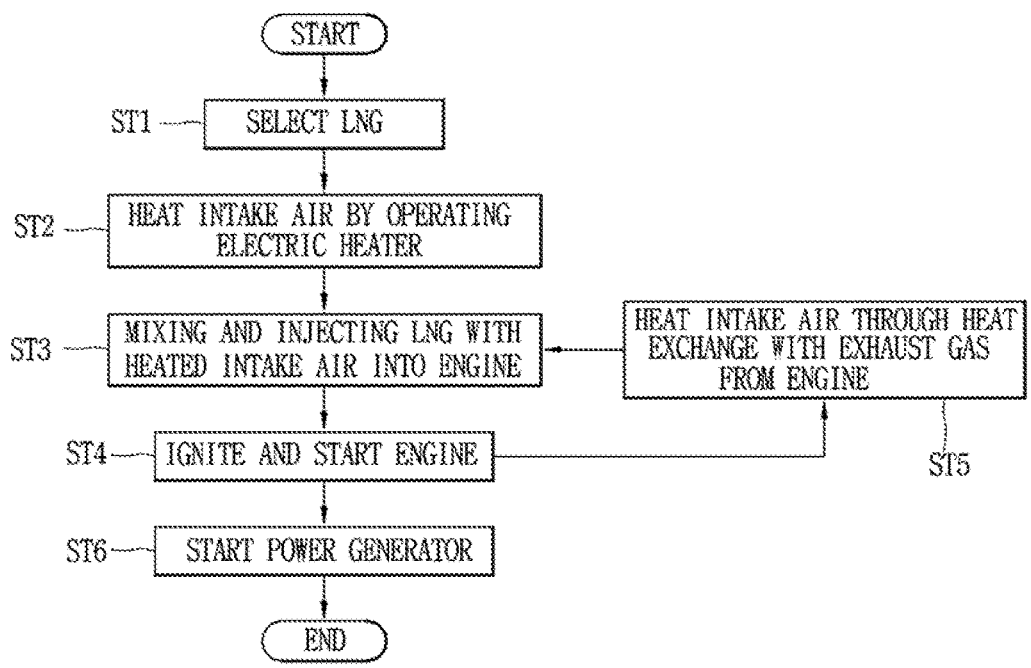
FIG. 3 is a flowchart showing the operation of an engine-driven electricity generation system using a diesel engine from a scrapped vehicle capable of using both diesel and LNG according to the present invention.

The configuration of an engine-driven electricity generation system using the scrapped diesel engine 10 capable of using both diesel and LNG according to the present invention was described above and a method of controlling and operating the engine-driven electricity generation system according to the present invention is described hereafter with reference to FIGS. 1 to 3. FIG. 2 is a schematic diagram showing a control system of an engine-driven electricity generation system using a diesel engine from a scrapped vehicle capable of using both diesel and LNG according to the present invention and FIG. 3 is a flowchart showing the operation of an engine-driven electricity generation system using a diesel engine from a scrapped vehicle capable of using both diesel and LNG according to the present invention.

The entire engine-driven electricity generation system according to the present invention is controlled by the controller 100. The controller 100 electronically controls basic operation of a diesel engine such as intake, exhaust, fuel injection, and operation of the cylinder 11 in the engine. Further, as shown in FIGS. 1 and 2, the controller 100 controls the electric heater 62, the first valve unit 33, the second valve unit 92, the first solenoid valve 82, and the second solenoid valve 92 in response to control orders from a setting unit 120, through which operation of the diesel engine and selection of fuel can be set, and sensing signals from the temperature sensor 66 and the engine start sensor, and displays the current operation mode or state of the diesel engine and the power generator 20 on a display unit 110.

In more detail, a worker initially selects fuel through the setting unit 120. When diesel is selected as the fuel, the diesel is directly injected into the engine without specific additional measures, thereby starting the engine and generating electricity, so the detailed description is not provided.

As shown in FIG. 3, when LNG is selected as the fuel (ST1), the controller 100 controls the first valve unit 33 to open the LNG supplying pipe 32 connected to the LNG tank 30 so that LNG is supplied to the LNG injection unit 34. Further, at the same time, the controller 100 operates the electric heater 62 to heat the intake air flowing through the intake pipe 60 (ST2). Since the temperature sensor 66 is disposed in the intake pipe 60, as described above, when the temperature of the intake air is increased over a predetermined temperature level by the electric heater 62, the controller 100 opens the intake valve 13 and operates the LNG injection unit 34 so that the LNG is mixed with the heated intake air, and then, the LNG mixed with the heated intake air is injected into the engine (ST3). Accordingly, explosion and ignition occur with compression of the piston 12 in the cylinder 11 of the scrapped diesel engine 10, whereby the engine is started (ST4).

When the engine is firstly started, the controller 100 stops the operation of the electric heater 62 in response to a signal from the engine start-sensing unit 86 and opens the first solenoid valve 82 and the second solenoid valve 92, whereby the exhaust gas discharged through the exhaust pipe 70 from the engine is sent to the first heat exchange pipe 80 and the second heat exchange pipe 90. The exhaust gas flowing through the first heat exchange pipe 80 is supplied to the heat exchanger 64 disposed in the intake pipe 60 and heats the intake air flowing through the intake pipe 60 by exchanging heat (ST5). The intake air heated by the exhaust gas is mixed with LNG and injected into the engine (ST3), thereby repeating ignition and operation of the engine (ST4). Further, as the engine is operated, the power generator 20 is operated (ST6), thereby generating electricity.

According to the present invention, it is possible to selectively use diesel and LNG by recycling a diesel engine obtained from a scrapped diesel vehicle, and particularly, it is possible to accelerate ignition of LNG by heating intake air with an electric heater when staring the engine and heating the intake air by restoring an exhaust gas after starting the engine. Further, it is possible to reduce rotational friction of a crankshaft and save fuel by reducing the viscosity of oil by heating an oil pan using an exhaust gas.

Specific embodiments of the present invention were described above. However, the spirit and scope of the present invention is not limited to the specific embodiments and it will be understood by those skilled in the art that the present invention may be changed and modified in various ways without departing from the scope of the present invention.

Therefore, the embodiments described above are provided for those skilled in the art to completely understand the present invention and should be construed as not limiting the present invention, but as examples in all respects, and the present invention should be defined by claims.

What is claimed is:

1. An engine-driven electricity generation system using a diesel engine from a scrapped vehicle capable of using both diesel and LNG, the system comprising:
   a scrapped diesel engine obtained from a scrapped diesel vehicle;
   a power generator connected to the scrapped diesel engine and generating electricity;
   an LNG tank keeping LNG as fuel for the scrapped diesel engine;
   a diesel tank keeping diesel as fuel for the scrapped diesel engine;
   an intake pipe for in-taking external air and then supplying the intake external air to the scrapped diesel engine;
   an exhaust pipe for discharging an exhaust gas produced by operation of the scrapped diesel engine to the outside;
   an electric heater heating intake air flowing through the intake pipe to firstly start the scrapped diesel engine when LNG is used as fuel for the scrapped diesel engine;
   a heat exchanger heating the intake air flowing through the intake pipe by restoring a exhaust gas discharged through the exhaust pipe after the scrapped diesel engine is started;
   a first solenoid valve controlling a exhaust gas which intake from the exhaust pipe to the heat exchanger;
   an LNG injection unit connected to the intake pipe, and injecting the LNG to inflow the injected LNG to the cylinder of the scrapped diesel engine;
   an LNG supplying pipe connecting the LNG injection unit and the LNG tank;
   a diesel supplying pipe connecting the injector of the scrapped diesel engine and the diesel tank;
   a first valve unit provided at the LNG supplying pipe, which controls supplying a LNG to the LNG injection unit;
   a second valve unit provided at the diesel supplying pipe, which controls supplying a diesel to the injector;

a controller controlling entire operation,
wherein when LNG is selected as fuel, the controller controls the first valve unit to supply a LNG to the LNG injection unit, and operates the electric heater to heat the intake air, and controls the LNG injection unit to inject a LNG, and after sensing that the scrapped diesel engine has been started, stops operation of the electric heater, and opens the first solenoid valve so that an exhaust gas discharged through the exhaust pipe is supplied to the heat exchanger and thus heats the intake air flowing through the intake pipe,
wherein the exhaust pipe and an oil pan coupled to the bottom of the scrapped diesel engine are connected through a second heat exchange pipe so that the oil pan is heated by an exhaust gas discharged through the exhaust pipe, and the second heat exchange pipe diverges from the exhaust pipe, turns around the outer side of the oil pan, and then returns to the exhaust pipe.

2. The system of claim 1, wherein the power generator includes an ESS (Energy Storage System) to keep the produced electricity.

3. The system of claim 1, wherein the produced electricity in the power generator is supplied to home appliances.

* * * * *